United States Patent
Drazic et al.

(10) Patent No.: US 7,317,578 B2
(45) Date of Patent: Jan. 8, 2008

(54) IMAGER TO IMAGER RELAY LENS SYSTEM

(75) Inventors: Valter Drazic, Betton (FR); Estill Thone Hall, Jr., Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 34 days.

(21) Appl. No.: 10/537,185

(22) PCT Filed: Nov. 26, 2003

(86) PCT No.: PCT/US03/38199

§ 371 (c)(1),
(2), (4) Date: Jun. 2, 2005

(87) PCT Pub. No.: WO2004/051362

PCT Pub. Date: Jun. 17, 2004

(65) Prior Publication Data

US 2006/0082892 A1    Apr. 20, 2006

Related U.S. Application Data

(60) Provisional application No. 60/430,995, filed on Dec. 4, 2002.

(51) Int. Cl.
*G02B 27/14* (2006.01)
(52) U.S. Cl. ............ 359/637; 359/259; 359/663; 359/708; 348/758
(58) Field of Classification Search ........... 359/259, 359/637, 663, 708; 348/744, 758
See application file for complete search history.

(56) References Cited

U.S. PATENT DOCUMENTS

| 3,391,968 | A | | 7/1968 | Betensky |
| 5,625,488 | A | | 4/1997 | Dietzsch et al. |
| 5,625,495 | A | * | 4/1997 | Moskovich ............... 359/663 |
| 6,198,577 | B1 | | 3/2001 | Kedar et al. |
| 6,339,503 | B1 | | 1/2002 | Derstine et al. |
| 6,654,156 | B1 | * | 11/2003 | Coker et al. ............. 359/290 |
| 7,101,048 | B2 | * | 9/2006 | Travis ..................... 353/69 |

FOREIGN PATENT DOCUMENTS

EP    385698    9/1990

OTHER PUBLICATIONS

Patent Abstracts of Japan, vol. 1996, No. 6, Jun. 28, 1996, No. 6, Jun. 28, 1996 & JP 8-043728 (NEC Corp), Feb. 16, 1996.
Search Report Dated Apr. 5, 2004.

* cited by examiner

*Primary Examiner*—Hung X. Dang
*Assistant Examiner*—Joseph Martinez
(74) *Attorney, Agent, or Firm*—Joseph J. Laks; Harvey D. Fried; Patricia Verlangieri

(57) ABSTRACT

A lens system for use in a two-stage projection system that relays light output from a first imager on a pixel-by-pixel basis onto a second imager (e.g. an LCOS). The lens system includes a double gauss lens set having a distortion of less than about 0.015% with at least about 90% of the light energy of a specific pixel projected within about a 15.4 micrometer square. Thus a projection system that enhances the contrast ratio for video images, particularly in the dark state, and reduces contouring artifacts, can be achieved.

16 Claims, 3 Drawing Sheets

IMAGER TO IMAGER RELAY LENS SYSTEM

CROSS-REFERENCE TO RELATED APPLICATIONS

This application claims the benefit, under 35 U.S.C. §365 of International Application PCT/US03/38199, filed Nov. 26, 2003, which was published in accordance with PCT Article 21(2) on Jun. 17, 2004 in English and which claims the benefit of U.S. provisional patent application No. 60/430,995, filed Dec. 4, 2002.

FIELD OF THE INVENTION

The present invention is related generally to a lens system for use in a projection system and more particularly to a low distortion, 1-to-1 projection lens for projecting an image from a first imager onto a second imager in a two stage projector architecture.

BACKGROUND

Liquid crystal displays (LCDs), and particularly liquid crystal on silicon (LCOS) systems using a reflective light engine or imager, are becoming increasingly prevalent in imaging devices such as rear projection television (RPTV). In an LCOS system, projected light is polarized by a polarizing beam splitter (PBS) and directed onto a LCOS imager or light engine comprising a matrix of pixels. Throughout this specification, and consistent with the practice of the relevant art, the term pixel is used to designate a small area or dot of an image, the corresponding portion of a light transmission, and the portion of an imager producing that light transmission.

Each pixel of the imager modulates the light incident on it according to a gray-scale factor input to the imager or light engine to form a matrix of discrete modulated light signals or pixels. The matrix of modulated light signals is reflected or output from the imager and directed to a system of projection lenses which project the modulated light onto a display screen, combining the pixels of light to form a viewable image. In this system, the gray-scale variation from pixel to pixel is limited by the number of bits used to process the image signal. The contrast ratio from bright state (i.e., maximum light) to dark state (minimum light) is limited by the leakage of light in the imager.

One of the major disadvantages of existing LCOS systems is the difficulty in reducing the amount of light in the dark state, and the resulting difficulty in providing outstanding contrast ratios. This is, in part, due to the leakage of light, inherent in LCOS systems.

In addition, since the input is a fixed number of bits (e.g., 8, 10, etc.), which must describe the full scale of light, there tend to be very few bits available to describe subtle differences in darker areas of the picture. This can lead to contouring artifacts.

One approach to enhance contrast in LCOS in the dark state is to use a COLORSWITCH™ or similar device to scale the entire picture based upon the maximum value in that particular frame. This improves some pictures, but does little for pictures that contain high and low light levels. Other attempts to solve the problem have been directed to making better imagers, etc. but these are at best incremental improvements.

What is needed is a projection system that enhances the contrast ratio for video images, particularly in the dark state, and reduces contouring artifacts.

SUMMARY

The present invention provides a lens system configured to project an image from a first imager on a pixel-by-pixel basis onto a second imager in a two stage projector architecture. To project an image from a first imager on a pixel-by-pixel basis onto a second imager, a double-gauss lens system is provided according to an embodiment of the present invention having a distortion of less than about 0.015% and projecting at least about 90% of the light energy of a specific pixel on the first imager within about a 15.4 micrometer square on the second imager. In an exemplary embodiment of the invention, the magnification of the lens system is very precisely controlled at about −1 and telecentricity is maintained at both the input and the output of the lens system.

BRIEF DESCRIPTION OF THE DRAWINGS

The invention will now be described with reference to the accompanying figures, of which.

DETAILED DESCRIPTION OF THE PREFERRED EMBODIMENT

The inventors have determined that, by projecting the output of a first imager onto a second imager such that the output of a particular pixel in the first imager is projected onto a corresponding pixel in the second imager, a projection system can be provided with enhanced contrast and reduced contouring. The inventors have determined that this two-stage architecture requires a lens system with very low distortion and highly ensquared energy. The light from a pixel on the first imager must be centered on its corresponding pixel. Also, most of the light must fall within the area of the corresponding pixel.

The present invention provides a low-distortion, high-ensquared energy, relay lens system for use in a two-stage projection architecture. In an exemplary embodiment of the invention, a double gauss lens system is provided to relay light from a first imager to a second imager 60 with distortion of less than 0.015% and at least 90% of the light energy from a specific pixel of the first imager 50 projected onto about a 15.4 micrometer square on the second imager. An exemplary two-stage projection system, as shown in FIG. 1, comprises a first imager 50 and a second imager 60, with two polarizing beam splitters (PBS's) 71, 72 and a lens set or lens system 80 disposed between the imagers 50, 60 to relay light images from the first imager 50 on a pixel-by-pixel basis onto corresponding pixels of the second imager 60.

Figure 1:
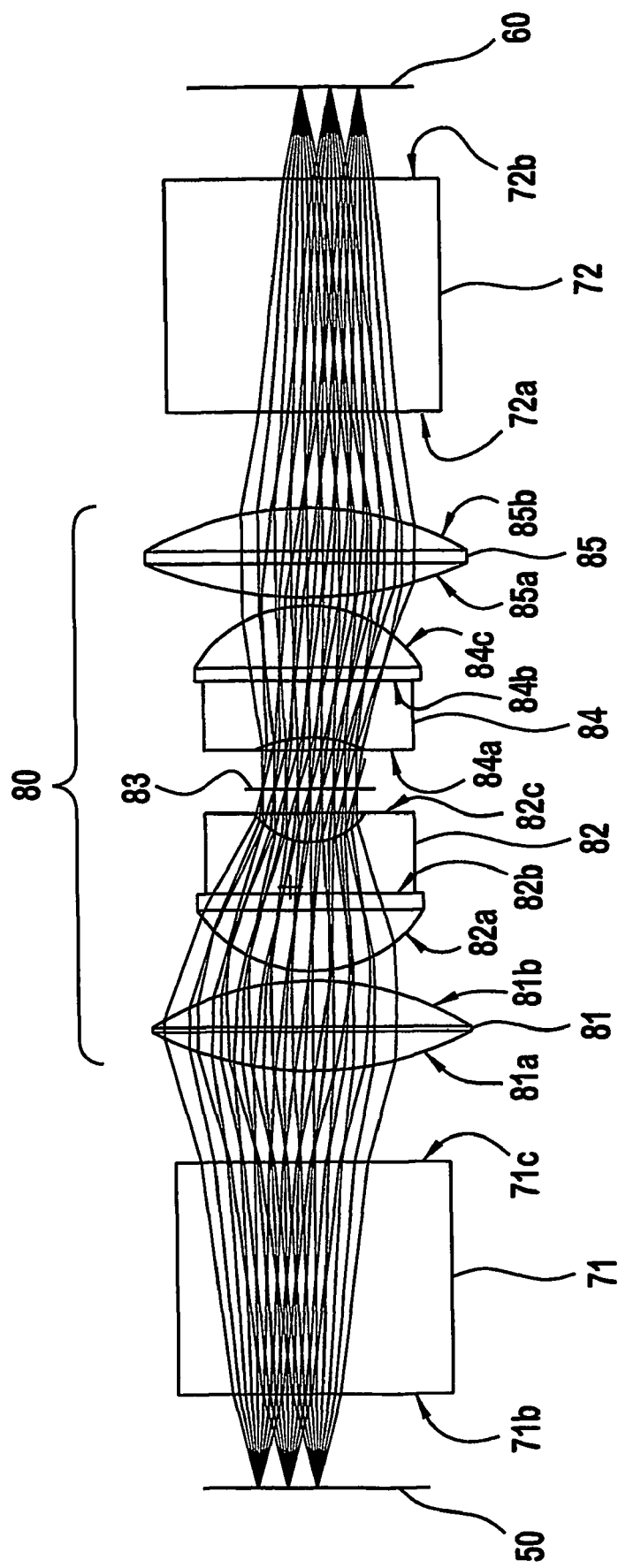
FIG. 1 shows an exemplary lens system according to an embodiment of the present invention.

As shown in FIG. 1, exemplary relay lens system 80 comprises a first aspherical lens 81 and a first acromatic lens 82 between the first PBS 71 and the focal point of the lens system or system stop 83. Between the system stop 83 and the second imager 72, lens system 80 comprises a second acromatic lens 84 and a second aspherical lens 85. First aspherical lens 81 has a first surface 81a and second surface 81b which bend the diverging light pattern from the first PBS 71 into a light pattern converging toward the optical axis of lens system 80. First acromatic lens 82 has a first surface 82a, a second surface 82b, and a third surface 82c, which focus the converging light pattern from the first aspherical lens 81 onto the system stop 83. At the system stop 83, the light pattern inverts and diverges. The second acromatic lens 84, which has a first surface 84a, a second surface 84b, and a third surface 84c, is a mirror image of first acromatic lens 82 (i.e., the same lens turned backward such that first surface 84a of second acromatic lens 84 is equivalent to third surface 82c of first acromatic lens 82 and third surface 84c of second acromatic lens 84 is equivalent to first surface 82a of first acromatic lens 82). The surfaces 84a, 84b, and 84c of second acromatic lens 84 distribute the diverging light pattern onto the second aspherical lens 85. The second aspherical lens 85, which has a first surface 85a and a second surface 85b, is a mirror image of the first aspherical lens 81. Surfaces 85a and 85b bend the light pattern to converge to form an inverted image on the second imager 72 that has a one-to-one correspondence to the object or matrix of pixels from the first imager 50. The surfaces of relay lens system 80 are configured to work with the imagers 50, 60 and PBS's 71, 72 to achieve the one-to-one correspondence of the pixels of first imager 50 and second imager 60. A summary of the surfaces of an exemplary two-stage projection system 30 are provided in Table 1, and aspherical coefficients for surfaces 81a, 81b, 85a, and 85a, and 85b are provided in Table 2. These exemplary lens surfaces were developed by the inventors using ZEMAX™ software and novel characteristics determined by the inventors. Various modifications can be made to this exemplary projection system based on such factors as: cost, size, luminance levels, and other design factors. In relay lens system 80 acromatic lenses 82 and 84 are equivalent and aspherical lenses 81 and 85 are equivalent. Therefore, fewer unique parts are required providing manufacturing efficiencies and reduced cost. Also, the acromatic lenses 82, 84 of the exemplary lens system 80, comprise inexpensive optical glass (SF15 having a cost approximately 2.25 times the cost of BK7 and BAK2 having a cost approximately 1.85 times the cost of BK7). (SF15, BK7, and BAK2 are commercially available from the Schott Corporation of Yonkers, N.Y.)

TABLE 2

| coefficient on: | surfaces 81a, 85b | surfaces 81b, 85a |
|---|---|---|
| $r^2$ | −2.5672672e−005 | −2.5672139e−005 |
| $r^4$ | −3.6464646e−007 | −4.6458644e−007 |
| $r^6$ | −1.3360629e−009 | −5.3232556e−010 |
| $r^8$ | 2.2079531e−012 | 9.3458426e−013 |
| $r^{10}$ | 4.0274312e−019 | −2.9875722e−019 |
| $r^{12}$ | 3.2408025e−022 | 8.6192792e−022 |
| $r^{14}$ | −4.2302691e−024 | 5.022829e−024 |
| $r^{16}$ | −1.3350251e−026 | 1.9281194e−026 |

After the first light matrix 5 leaves the relay lens system 80, it enters into a second PBS 72 through a first surface 72a. Second PBS 72 has a polarizing surface 72p that reflects the s-polarity first light matrix 5 through a second surface 72b onto the second imager 60. In the exemplary embodiment, illustrated in FIG. 1, second imager 60 is an LCOS imager which modulates the previously modulated first light matrix 5 on a pixel-by-pixel basis proportional to a gray scale value provided to the second imager 60 for each individual pixel. The pixels of the second imager 60 correspond on a one-for-one basis with the pixels of the first imager 50 and with the pixels of the display image. Thus, the input of a particular pixel (i,j) to the second imager 60 is the output from corresponding pixel (i,j) of the first imager 50.

Figure 2:
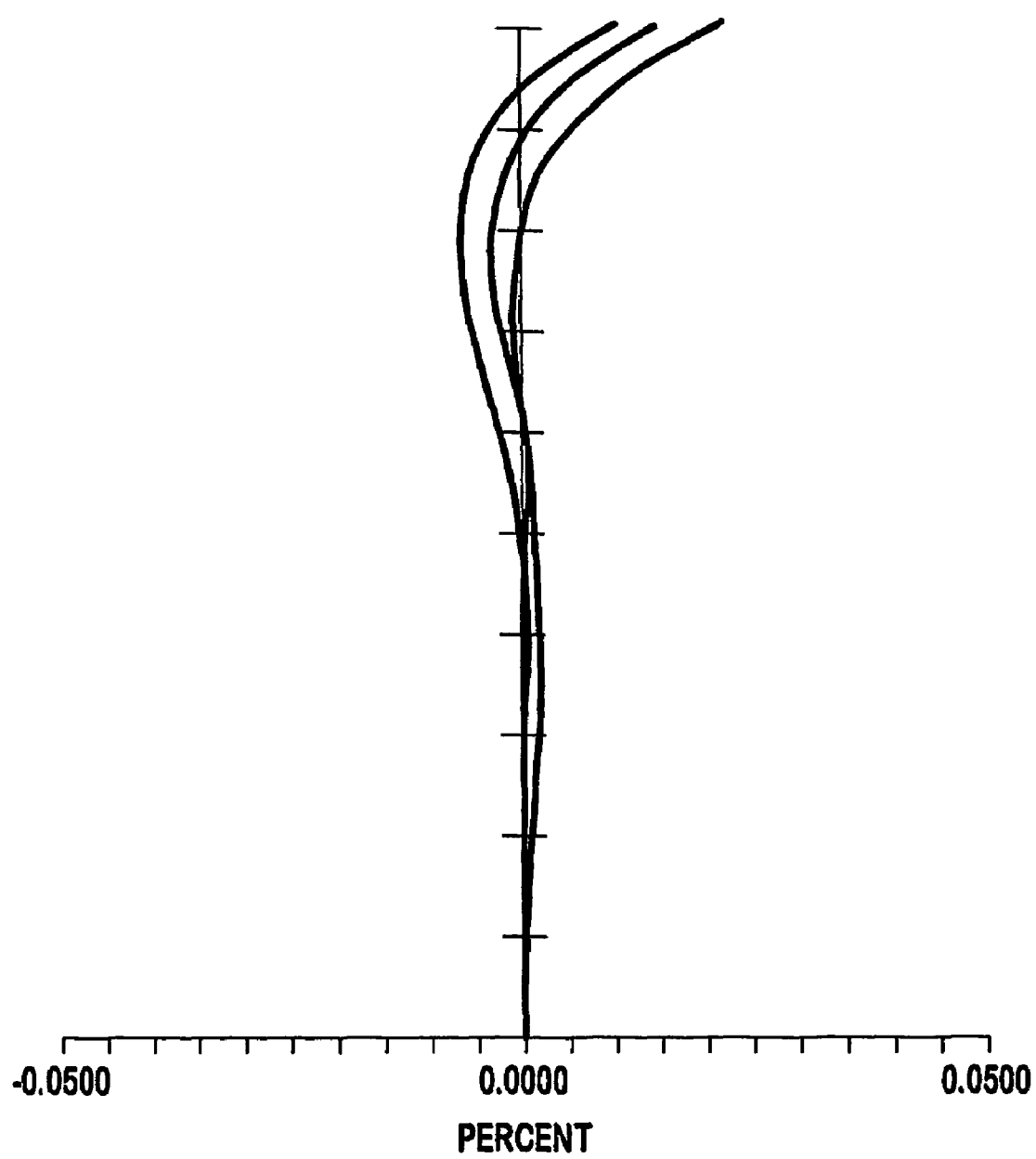
FIG. 2 shows the calculated distortion for the lens system of FIG. 1.
Figure 3:
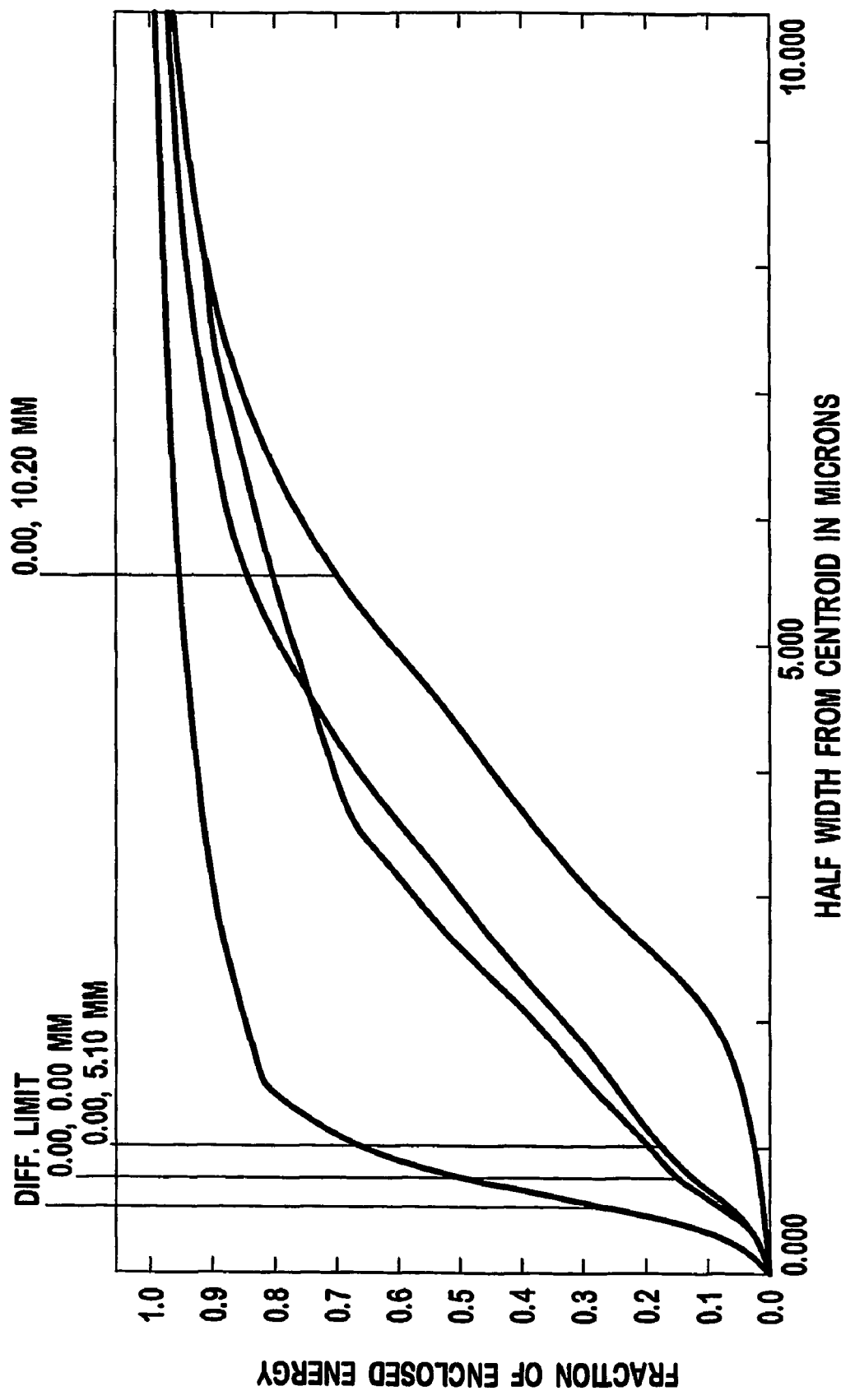
FIG. 3 shows the calculated ensquared energy for the lens system of FIG. 1.

The lens system 80 summarized in Tables 1 and 2 was designed using the ZEMET™ software package under system constraints devised by the inventors. The calculated distortion and the ensquared energy of the lens system 80 are shown in FIGS. 2 and 3, respectively. The distortion is less than 0.015%, causing the light output from a particular pixel (i,j) in the first imager 50 to be relayed or projected onto a corresponding pixel (i,j) in the second imager 60, allowing a video image, for example, to be modulated by a combination of values provided to the first imager 50 and second imager 60 for that pixel (i,j). The light energy from the first imager 50 is highly ensquared, with at least 90% of the light energy output from a particular pixel (i,j) on the first imager 50 being projected onto a 15.4 micron square on the second imager 60. Since the pixel size for an exemplary LCOS imager is 12 microns, the majority of light from a particular pixel (i,j) on the first imager 50 will fall on the corresponding pixel (i,j) on the second imager 60.

TABLE 1

(dimensions in mm)

| device | surface | type | radius | thickness | glass | diameter | conic |
|---|---|---|---|---|---|---|---|
| 50 | object | std | infinity | 11.25436 | | | 0 |
| 71 | 2nd (71b) | std | infinity | 28 | SF2 | 24.07539 | 0 |
| 71 | 3rd (71c) | std | infinity | 11.44304 | | 29.59782 | 0 |
| 81 | 1st (81a) | evenasph | 45.72373 | 11.60359 | BAK2 | 40 | −0.941321 |
| 81 | 2nd (81b) | evenasph | −29.74398 | 1.061985 | | 40 | −2.300802 |
| 82 | 1st (82a) | std | 16.45201 | 9.507266 | BAK2 | 28 | −0.003454099 |
| 82 | 2nd (82b) | std | 696.8212 | 6.993905 | SF15 | 28 | 0 |
| 82 | 3rd (82c) | std | 10.75055 | 6.389217 | | 14 | 0 |
| 83 | stop | std | infinity | 6.389217 | | 10.09268 | 0 |
| 84 | 1st (84a) | std | −10.75055 | 6.993905 | SF15 | 14 | 0 |
| 84 | 2nd (84b) | std | −696.8212 | 9.507266 | BAK2 | 28 | 0 |
| 84 | 3rd (84c) | std | −16.45201 | 1.061985 | | 28 | −0.003454099 |
| 85 | 1st (85a) | evenasph | 29.74398 | 11.60359 | BAK2 | 40 | −2.300802 |
| 85 | 2nd (85b) | evenasph | −45.72373 | 11.44304 | | 40 | −0.941321 |
| 72 | 1st (72a) | std | infinity | 28 | SF2 | 31.9247 | 0 |
| 72 | 2nd (72b) | std | infinity | 11.25436 | | 25.06428 | 0 |
| 60 | image | std | infinity | | | 20.44114 | 0 |

The magnification for a one-to-one lens system should be approximately −1.0 when the imagers 50, 60 are the same size to project an image from the first imager 50 onto the second imager 60 on a pixel-by-pixel basis. The exemplary lens system 80 provides a magnification of −0.99977 as calculated by the ZEMAX™ software.

The exemplary lens system 80 also provides a low F-number of no greater than 2.8, and more particularly a calculated F-number of about 2.798. This low F-number is desired to ensure adequate illumination of the viewing screen. The exemplary lens system 80 is also compact, having an overall distance between imagers 50, 60 of about 161.25 mm. This overall length is a summation of the thickness values for the various surfaces of the lens system, the thickness values being the linear distance to the next surface.

Also, because the light input to the projection system is telecentric and the projection lens requires a telecentric image, the lens system 80 must be highly telecentric. The calculated maximum deviations from the chief ray in the center of the projected image for the exemplary lens system 80 are 1.03 degrees of input angle and 1.00 degrees of output angle.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A lens system for use in a projection system for relaying light output from a first imager on a pixel-by pixel basis onto a second imager, the lens system comprising a double gauss lens set having a distortion of less than about 0.015% with at least about 90% of the light energy of a specific pixel projected within a 15.4 micrometer square.

2. The lens system of claim 1 wherein said double gauss lens set has a magnification of between about −0.9997 and −1.0003.

3. The lens system of claim 1 wherein said double gauss lens set has a telecentricity with an input and output angle deviation of less than 1.05 degrees.

4. The lens system of claim 3 wherein said double gauss lens set has a telecentricity with an input angle deviation of less than 1.03 degrees and an output angle deviation of less than 1.0 degrees.

5. The lens system of claim 3 wherein said double gauss lens set consists of a pair of symmetrical aspherical lenses surrounding a pair of symmetrical acromatic lenses.

6. The lens system of claim 5 wherein said acromatic lenses comprise optical glass.

7. The lens system of claim 1 wherein the total distance between the first and second imagers is less than 165 mm.

8. The lens system of claim 1 wherein the total distance between the first and second imagers is about 161.25 mm.

9. The lens system of claim 1 wherein the double gauss lens set has an F-number no greater than about 2.8.

10. An imager to imager relay lens system for use in a projection system, comprising a lens set consisting of one pair of equivalent acromatic lenses and one pair of equivalent aspherical lenses positioned and configured to project the light output from a particular pixel on a first imager onto a corresponding pixel on a second imager.

11. The imager to imager relay lens system of claim 10 wherein the total distortion of said relay lens system is less than about 0.015% with at least about 90% of the light energy of a specific pixel projected within a 15.4 micrometer square, said relay lens system further having a magnification of between about −0.9997 and −1.0003.

12. The imager to imager relay lens system of claim 10 wherein said lens set has a telecentricity with an input and output angle deviation of less than 1.05 degrees.

13. The imager to imager relay lens system of claim 12 wherein said lens set has a telecentricity with an input angle deviation of less than 1.03 degrees and an output angle deviation of less than 1.0 degrees.

14. The imager to imager relay lens system of claim 10 wherein the total distance between the first and second imagers is less than 165 mm.

15. The imager to imager relay lens system of claim 10 wherein the total distance between the first and second imagers is about 161.25 mm.

16. The imager to imager relay lens system of claim 10 wherein the lens set has an F-number no greater than about 2.8.

* * * * *